H. H. PATTERSON.
TALLYING DEVICE.
APPLICATION FILED MAR. 22, 1916.
1,219,858.
Patented Mar. 20, 1917.
2 SHEETS—SHEET 1.
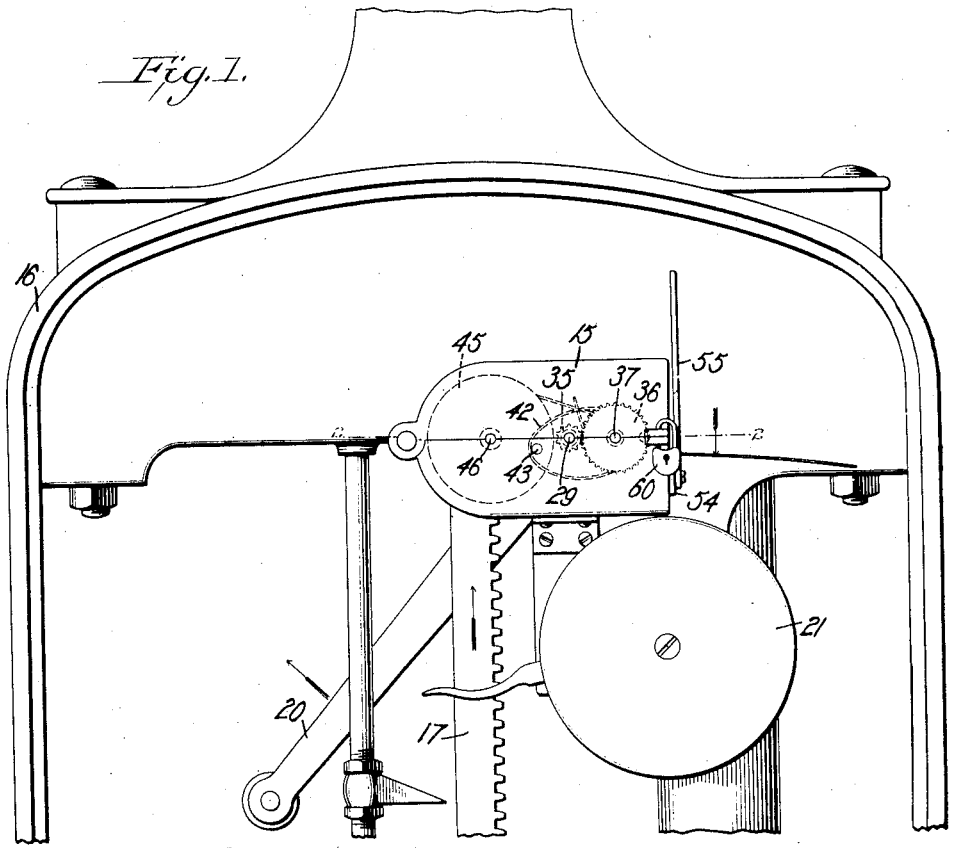
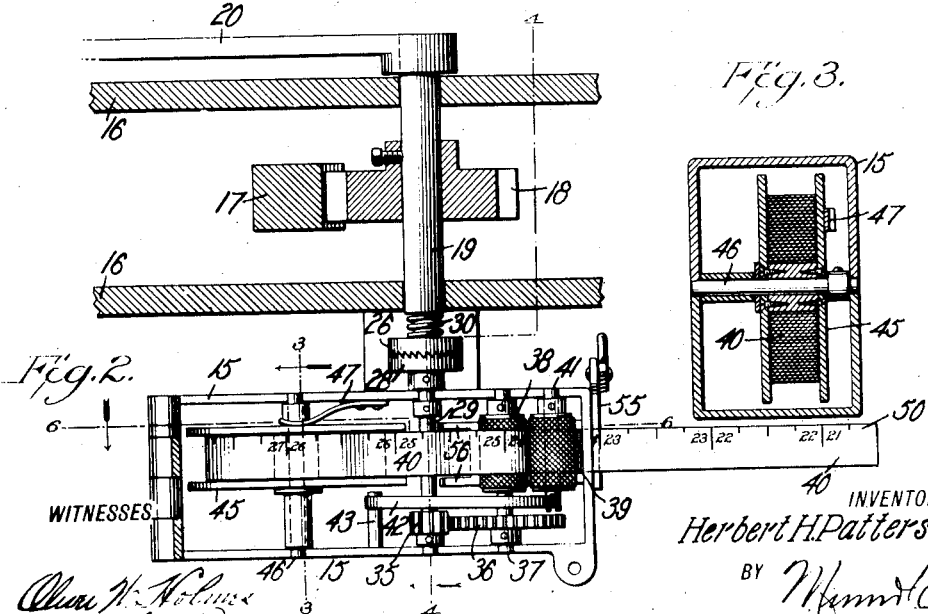
WITNESSES
INVENTOR
Herbert H. Patterson
BY
ATTORNEYS H. H. PATTERSON.
TALLYING DEVICE.
APPLICATION FILED MAR. 22, 1916.
1,219,858.
Patented Mar. 20, 1917.
2 SHEETS—SHEET 2.
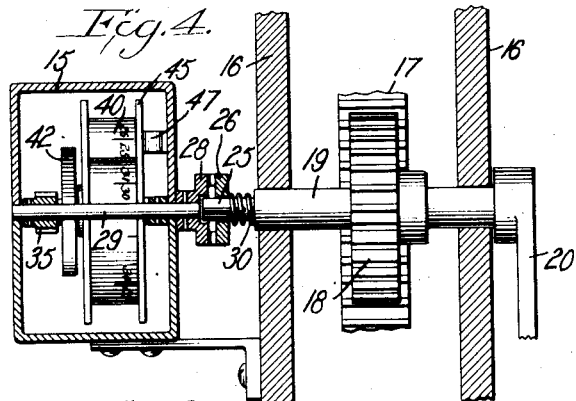
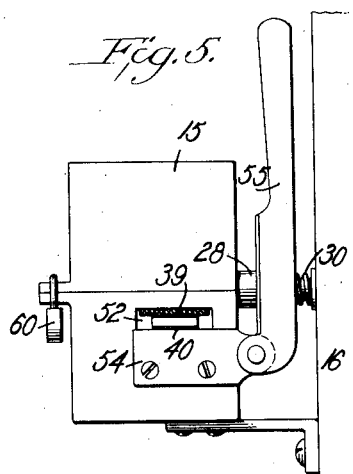
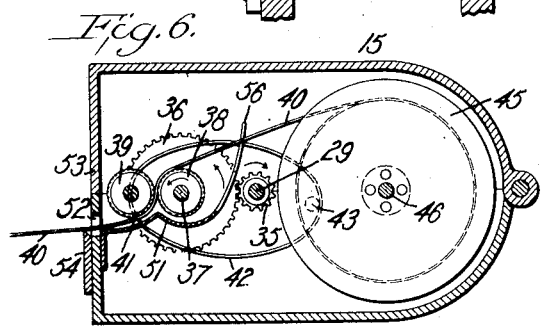
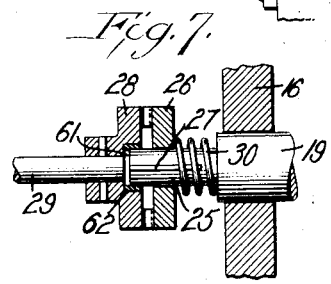
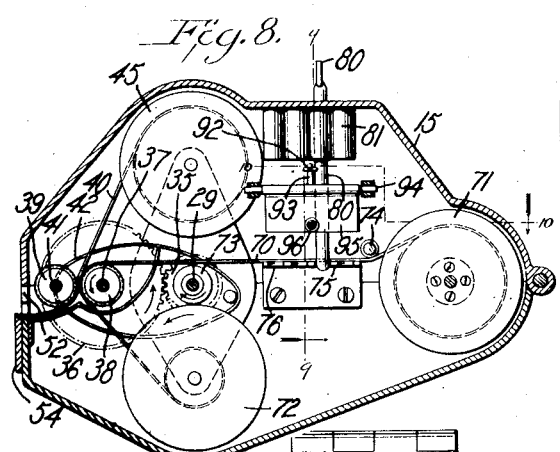
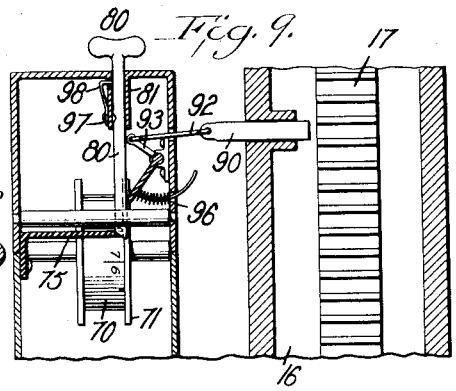
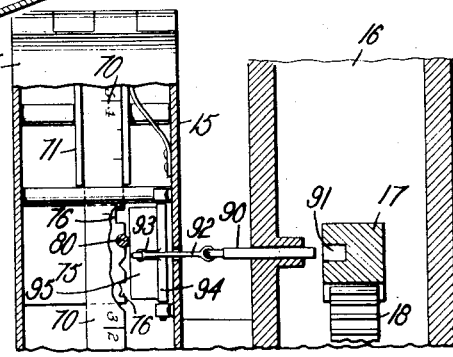
WITNESSES
INVENTOR
Herbert H. Patterson
BY
ATTORNEYS

UNITED STATES PATENT OFFICE.

HERBERT HARVEY PATTERSON, OF HUDSON FALLS, NEW YORK.

TALLYING DEVICE.

1,219,858.　　　　Specification of Letters Patent.　　Patented Mar. 20, 1917.

Application filed March 22, 1916. Serial No. 85,867.

*To all whom it may concern:*

Be it known that I, HERBERT HARVEY PATTERSON, a citizen of the United States, and a resident of Hudson Falls, in the county of Washington and State of New York, have invented a new and Improved Tallying Device, of which the following is a full, clear, and exact description.

The object of the invention is to provide a new and improved tallying device more especially designed for use on gasolene pumps such as are used in garages or on the sidewalk in front of garages, and arranged to furnish accurate records of the amount of gasolene passing through the pump and delivered to the various customers, thus enabling the proprietor to make the proper charges against the customers or buyers of the gasolene.

In order to accomplish the desired result, use is made of a tallying device having a driving connection with a movable part of the pump to actuate the tallying device on actuating the pump, the tallying device having a pair of driven rollers and a tape passing between the rollers, the tape being provided with a graduation representing a standard liquid measure and the graduation corresponding to the delivery capacity of the pump, and the said driving connection being proportioned relatively to the said pump and the rollers for the latter to move the tape corresponding to the amount of liquid discharged by the pump at the time.

A practical embodiment of the invention is represented in the accompanying drawings forming a part of this specification, in which similar characters of reference indicate corresponding parts in all the views.

Figure 1 is a side elevation of the tallying device as applied to a gasolene pump such as is now generally used in garages or on the sidewalk in front of a garage;

Fig. 2 is an enlarged sectional plan view of the same on the line 2—2 of Fig. 1;

Fig. 3 is a transverse section of the same on the line 3—3 of Fig. 2;

Fig. 4 is a similar view of the same on the line 4—4 of Fig. 2;

Fig. 5 is a front end elevation of the same and showing more particularly the cutting edge for cutting off the tape;

Fig. 6 is a rear sectional elevation of the tallying device on the line 6—6 of Fig. 2;

Fig. 7 is an enlarged cross section of the clutch mechanism connecting the driving gear of the tallying device with a ratchet member of the pump;

Fig. 8 is a sectional side elevation of a modified form of the tallying device;

Fig. 9 is a transverse section of the same as applied, the section being on the line 9—9 of Fig. 8; and Fig. 10 is a sectional plan view of the same as applied, the section being on the line 10—10 of Fig. 8.

In using garage and sidewalk pumps for delivering a measured quantity of gasolene to the storage tank of automobiles, it is next to impossible for the owner of the garage or his employee to keep accurate tally of the amounts of gasolene dispensed to the various customers and in a rush it frequently happens that one customer's account is not charged up at all, to the loss of the garage owner, while another customer may feel that he is overcharged and thus eventually the garage owner is liable to lose said customer. In order to avoid such result and to provide means whereby a correct record of each individual transaction is made is the object of the invention presently to be described in detail.

The casing or housing 15 of the tallying device is attached to the framework 16 of a pump, such as is now generally used in garages or on sidewalks in front of garages for delivering gasolene to the storage tanks of automobiles. The pump, as is well known, is provided with a piston rack 17 connected with the piston and measuring cylinder of the pump, and this rack 17 is in mesh with a pinion 18 secured on the shaft 19 journaled in suitable bearings on the framework 16 and provided at one outer end with a crank handle 20 under the control of the operator for imparting a turning motion to the shaft 19 and the pinion 18 with a view to raise or lower the rack 17. It is understood that when the rack 17 is raised a measured quantity of gasolene is discharged from the pump and this amount of gasolene is registered by a device 21 indicated in Fig. 1, which is controlled by a stop (not shown) on the rack 17. The end of the shaft 19 opposite the one carrying the crank handle 20 has a reduced portion 25 on which is mounted a clutch member 26 by the use of a key 27 to cause the clutch member 26 to rotate with the shaft 19 and to be free to slide thereon in the direction of the axis of the shaft. The clutch member 26 is pressed in mesh with a clutch member 28 secured on a shaft 29 journaled in suitable bearings arranged in the casing 15 of the tallying device. A spring 30 presses the clutch member 26 to hold the latter in engagement with the clutch member 28. The clutch members 26 and 28 have ratchet teeth so that when the shaft 19 is rotated in one direction at the upward movement of the rack 17, then the clutch member 26 carries the clutch member 28 along thereby rotating the shaft 29. When the shaft 19 is rotated in an opposite direction on the downward movement of the rack 17 then the clutch 28 remains at a standstill while the teeth of the clutch member 26 glide over the teeth of the clutch member 28.

On the shaft 29 within the casing 15 is secured a pinion 35 in mesh with a gear wheel 36 secured on a shaft 37 journaled in suitable bearings arranged in the casing 15. On the shaft 37 is secured or formed a drawing roller 38 operating in conjunction with a second drawing roller 39 to draw a tape 40 between the peripheral faces of the said rollers 38 and 39. The rollers 38 and 39 have their peripheral faces roughened or knurled, as plainly indicated in Fig. 2, and the shaft 41 of the roller 39 is loosely journaled at one end in the rear side of the casing 15, and the other end of the said shaft 41 is engaged by an elliptical spring 42 held on a stud 43 attached to the casing 15. By the arrangement described the roller 39 is pressed against the driven roller 38 to insure a positive drawing of the tape 40 between the said rollers 38 and 39. The tape 40 unwinds from a reel 45 having its shaft 46 journaled in suitable bearings arranged in the casing 15, and one side of the said reel is pressed on by a spring 47 to prevent the reel from rotating too far at the time the tape 40 is drawn between the rollers 38 and 39.

The tape 40 of paper or other suitable material is provided with a graduation 50 representing standard liquid measurement such as gallons, and subdivisions thereof such as quarts, as plainly indicated in Fig. 2. The graduation 50 is so arranged relatively to the driving gear for the driven roller 38 that when the pump delivers one gallon of gasolene then the rollers 38 and 39 feed the tape forward a distance corresponding to one gallon, as indicated by the graduation 50. In a like manner when the pump delivers but a half gallon the tape 40 is moved forward a distance of two quarts, as indicated by the graduation 50.

Directly under the rollers 38 and 39 is arranged a guide 51 attached at its forward end to the casing 15 adjacent the outlet 52 formed in the front end 53 of the casing 15. On the outer face of the front 53 is secured a fixed knife 54 with which coacts a pivoted knife 55 under the control of the operator in charge of the pump to cut off the tape fed through the outlet 52. This cut-off portion of the tape can be readily inscribed by the operator with the name of the customer to whom the gasolene was delivered, as indicated, for instance, in Fig. 2, which shows the amount delivered at the time as two and a half gallons. The rear end 56 of the guide 51 is in the form of a fork, between the members of which passes the tape 40 so as to guide the latter from the reel 45 to the driven roller 38. In practice, the casing 15 is preferably made in two parts hinged together to permit of opening the casing for conveniently replenishing the reel 45 with a new tape 40 whenever it is necessary. The casing 15, however, is normally locked against opening by a suitable lock 60, as shown in Figs. 1 and 5.

In attaching the tallying device to the pump the inner face of the clutch member 28 is provided with a central recess 61 (see Fig. 7) into which fits a sleeve 62 engaged by the end of the terminal of the reduced portion 25 of the shaft 19. After the tallying device is attached the sleeve 62 is removed to allow a free return movement of the clutch member 26 relatively to the clutch member 28 without danger of binding.

The operation is as follows:

When the operator in charge of the pump turns the crank handle 20 in one direction to raise the rack 17, then an amount of gasolene is delivered by the pump corresponding to the distance to which the rack 17 is raised, and the drawing or feed roller 38 is turned a corresponding distance to pass the tape through the outlet 52 and pass the knife 54 a corresponding distance according to the amount of the liquid pumped, and then the operator swings the knife 55 downward so as to cut off the projected end of the tape 40. The operator next writes the name of the customer on the cut off portion or ticket. It is understood that the ticket is not cut off until the desired amount of gasolene has been delivered to a single customer. As previously stated, the tallying device remains at a standstill during the return movement of the rack 17. The operator in charge of the pump after having served a number of customers, say in rapid succession during a rush, can retain the slips, then deliver the same in a bunch to the cashier or other person in charge of the accounts to be posted against the accounts of the various customers. In a like manner, if a cash transaction is made, the operator can mark the cut-off ticket correspondingly.

In case it is desired to obtain a record of all the transactions made during a day or other period of time then use is made of an additional tape 70 (see Figs. 8, 9 and 10), and which tape unwinds from a reel 71 journaled within the casing 15 and passing around the driven roller 38 together with the tape 40 unwinding from the reel 45, as previously explained. The tape 70 after leaving the driven roller 38 winds up on the winding-up reel 72 driven by a friction pulley 73 secured on the shaft 29. The tape 70 after leaving the reel 71 passes under a guide rod 74 and then passes over a plate 75 attached to the inside of the casing 15. The plate 75 is provided at one edge with a number of differently shaped notches 76 adapted to coact with correspondingly shaped ends of keys 80 to make notches or cuts in the corresponding edge of the tape 70. The keys 80 are in the possession of different employees of the establishment and are used by such employees when operating the pump to identify the operator on the tape 70 by the notch cut into the tape and which corresponds in shape to the end of the corresponding key 80. Each of the keys 80 is adapted to be inserted into the casing 15 through different key guides 81 attached to the casing.

Each of the keys 80 controls a locking bolt 90 mounted to slide in the framework 16 of the pump to engage a recess 91 formed in the rack 17 to normally lock the latter against movement. The outer end of the bolt 90 is connected by a link 92 with an arm 93 secured on a shaft 94 and journaled in the casing 15 and provided with a wing 95 pressed on by a spring 96 to normally hold the wing in the path of any one of the keys 80. Normally the bolt 90 is held in locking engagement with the rack 17 by the action of the spring 96, but when the key 80 is inserted in the corresponding guideway 81 then the wing 95 is swung downward against the tension of the spring 96 and in doing so the arm 93 exerts a pull on the link 92 to retract the bolt 90 from the rack 17, thus unlocking the latter. When the key is inserted as described its lower end makes a mark in the edge of the tape 70, but in order to allow forward movement of the tape 70 the operator withdraws the key 80 a short distance to free the tape but without allowing the wing 95 to swing back to normal position. In order to hold the key 80 in the partly retracted position the key is provided with a notch 97 (see Fig. 9) adapted to be engaged by a spring catch 98 to hold the key in this retracted position until the transaction is completed, after which the key is completely withdrawn from the key guide 81 by the operator in charge of the pump at the time.

It is understood that in the apparatus just described, both tapes 40 and 70 are fed simultaneously forward by the action of the rollers 38 and 39, and the projecting end of the tape 40 is cut off by the operator as previously explained while the other tape 70 is wound up on the winding-up reel 72. This tape 70 is provided with a graduation similar to the graduation on the tape 40 and it furnishes a complete record of the transaction made during a given period of time. By comparing the tickets delivered by the operators during a given period of time with the marked record of the tape 70 any mistake can be readily located and charged to the corresponding operator owing to the identifying marks on the tape 70 produced by the keys 80.

Having thus described my invention, I claim as new and desire to secure by Letters Patent:

1. A tallying device for garage pumps, comprising a reel, a graduation tape unwinding from the said reel, a pair of rollers between which passes the tape, a gearing driving one of the said rollers, a plate over which passes the said tape from the reel to the rollers, the plate having differently shaped notches along one edge for register with correspondingly shaped keys to mark the corresponding edge of the tape.

2. A tallying device for garage pumps, comprising a reel, a graduation tape unwinding from the said reel, a pair of rollers between which passes the tape, a gearing driving one of the said rollers, a plate over which passes the said tape from the reel to the rollers, the plate having different shaped notches along one edge for register with correspondingly shaped keys to mark the corresponding edge of the tape, a spring-pressed pivoted wing adapted to be engaged by the key when inserted, and a locking bolt for the pump and controlled by the said wing.

3. A tallying device for automobile pumps, comprising a casing, a reel within the casing and from which unwinds a graduated tape, a pair of rollers journaled in the casing and between which passes the tape unwound from the reel, a winding up reel on which winds the said tape, a gearing for driving one of the said rollers, a plate in the said casing intermediate the driven roller and the reel carrying the tape, said plate having differently shaped notches along one side, and key guides in register with the said notches for the insertion of keys with ends shaped to correspond to the said notches, as described.

4. A tallying device for automobile pumps, comprising a casing, a reel within the casing, and from which unwinds a graduated tape, a pair of rollers journaled in the casing and between which passes the tape unwound from the reel, a winding up reel on which winds said tape, a gearing for driving one of the said rollers, a plate in the said casing intermediate the driven roller and the reel-carrying tape, the plate having differently shaped notches along one side, key guides in register with the said notches for the insertion of keys with ends shaped to correspond to the said notches, and a spring-pressed wing pivoted in the casing and in the path of the inserted key, the wing being connected with the said locking device to unlock the pump on the insertion of a key.

5. A tallying device for automobile pumps, comprising a casing, a reel within the casing and from which unwinds a graduated tape, a pair of rollers journaled in the casing and between which passes the tape unwound from the reel, a winding up reel on which winds the said tape, a gearing for driving one of the said rollers, a plate in the said casing intermediate the driven roller and the reel carrying the tape, said plate having differently shaped notches along one side, key guides in register with the said notches for the insertion of keys with ends shaped to correspond to the said notches, a locking device for locking the pump, a spring-pressed wing pivoted in the casing and in the path of the inserted key, the wing being connected with the said locking device to unlock the pump on the insertion of a key, and means in the casing to hold an inserted key in a partly retracted position.

In testimony whereof I have signed my name to this specification in the presence of two subscribing witnesses.

HERBERT HARVEY PATTERSON.

Witnesses:
EDWARD E. SALOIM,
GRENVILLE M. INGALSBE.